(12) United States Patent
Wong et al.

(10) Patent No.: US 12,099,226 B2
(45) Date of Patent: Sep. 24, 2024

(54) OPTICAL SYSTEM

(71) Applicant: 3M INNOVATIVE PROPERTIES COMPANY, St. Paul, MN (US)

(72) Inventors: Timothy L. Wong, St. Paul, MN (US); David J. W. Aastuen, Shoreview, MN (US); Takashi Fujita, Tokyo (JP); Zhisheng Yun, Sammamish, WA (US); Timothy J. Nevitt, Red Wing, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 821 days.

(21) Appl. No.: 17/259,378

(22) PCT Filed: Aug. 13, 2019

(86) PCT No.: PCT/IB2019/056869
§ 371 (c)(1),
(2) Date: Jan. 11, 2021

(87) PCT Pub. No.: WO2020/035791
PCT Pub. Date: Feb. 20, 2020

(65) Prior Publication Data
US 2021/0294012 A1 Sep. 23, 2021

Related U.S. Application Data

(60) Provisional application No. 62/718,581, filed on Aug. 14, 2018.

(51) Int. Cl.
*G02B 5/30* (2006.01)
*G02B 27/01* (2006.01)

(52) U.S. Cl.
CPC ........... *G02B 5/305* (2013.01); *G02B 5/3058* (2013.01); *G02B 5/3083* (2013.01); *G02B 27/0172* (2013.01); *G02B 2027/0118* (2013.01)

(58) Field of Classification Search
CPC .... G02B 5/305; G02B 5/3058; G02B 5/3083; G02B 17/0856; G02B 27/0172; G02B 27/28; G02B 2027/0118
(Continued)

(56) References Cited

U.S. PATENT DOCUMENTS 5,882,774 A 3/1999 Jonza
5,966,242 A 10/1999 Yamanaka
(Continued)

FOREIGN PATENT DOCUMENTS

WO WO 2018-116080 6/2018

OTHER PUBLICATIONS

Adachi, "Enhancement of Blue-Light-Emission Properties for OLED Displays by Using a Polarized Light-Recycling Structure", Journal of the Society for Information Display, 2008, vol. 16, No. 08, pp. 875-881.

(Continued)

*Primary Examiner* — Ricky D Shafer
(74) *Attorney, Agent, or Firm* — Clifton F. Richardson

(57) ABSTRACT

An optical system for displaying an image to a viewer includes a pixelated display including a plurality of pixels emitting unpolarized image light; a partial reflector having an average optical reflectance of at least 30% in a predetermined wavelength range; a first retarder layer disposed between the pixelated display and the partial reflector; a second retarder layer disposed between the first retarder layer and the partial reflector; and a reflective polarizer disposed between the first and second retarder layers. The reflective polarizer is adapted to increase a brightness of a pixelated image emitted by the pixelated display and displayed to the viewer by recycling at least a portion of unpolarized image light emitted by the pixels; and receive an (Continued)

image ray reflected by the partial reflector and reflect the received image ray toward the viewer.

11 Claims, 5 Drawing Sheets

(58) Field of Classification Search
USPC .................. 359/485.05, 487.01, 489.07
See application file for complete search history.

(56) References Cited

U.S. PATENT DOCUMENTS

| | | |
|---|---|---|
| 6,179,948 B1 | 1/2001 | Merrill |
| 6,271,969 B1 | 8/2001 | Mertz |
| 6,300,991 B1 | 10/2001 | Schadt |
| 6,665,031 B2 | 12/2003 | Roest |
| 6,717,644 B2 | 4/2004 | Schadt |
| 6,783,349 B2 | 8/2004 | Neavin |
| 6,905,739 B2 | 6/2005 | Cherkaoui |
| 7,201,948 B2 | 4/2007 | Moia |
| 7,364,671 B2 | 4/2008 | Schadt |
| 9,162,406 B2 | 10/2015 | Neavin |
| 9,557,568 B1 | 1/2017 | Ouderkirk |
| 9,773,847 B2 | 9/2017 | Epstein |
| 10,663,745 B2 * | 5/2020 | Ouderkirk .............. H04N 9/315 |
| 10,691,198 B1 * | 6/2020 | Gollier ............... G02B 27/0018 |
| 11,156,814 B2 * | 10/2021 | Steiner ............... G02B 27/0172 |
| 11,327,324 B2 * | 5/2022 | Ouderkirk .......... G02B 27/0955 |
| 11,435,514 B2 * | 9/2022 | Yun ..................... G02B 5/3083 |
| 11,726,249 B2 * | 8/2023 | Yun ..................... G02B 5/3083 |
| | | 359/489.07 |
| 2007/0165154 A1 * | 7/2007 | Whitney ........... G02F 1/133605 |
| | | 349/61 |
| 2010/0254002 A1 | 10/2010 | Merrill |
| 2013/0222732 A1 * | 8/2013 | O'Neill ............... G02F 1/13362 |
| | | 349/62 |
| 2017/0017077 A1 | 1/2017 | Tang et al. |
| 2017/0068105 A1 * | 3/2017 | Yun ..................... G02B 27/0983 |
| 2017/0357100 A1 * | 12/2017 | Ouderkirk .......... G02B 19/0028 |
| 2019/0384070 A1 * | 12/2019 | Geng ..................... G02B 27/28 |
| 2020/0053350 A1 * | 2/2020 | Hudman .............. G02B 5/3025 |
| 2021/0215865 A1 * | 7/2021 | Le .......................... G02B 27/28 |

OTHER PUBLICATIONS

Berreman, "Bragg Reflection of Light from Single-Domain Cholesteric Liquid-Crystal Films", Physical Review Letters, 1970, vol. 25, No. 13, pp. 577-581.

International Search Report for PCT International Application No. PCT/IB2019/056869, mailed on Nov. 27, 2019, 4 pages.

* cited by examiner

OPTICAL SYSTEM

BACKGROUND

Optical systems can be used in head-mounted displays, for example, to provide images to a viewer. The optical system can include a partial reflector, a reflective polarizer, and a display panel.

SUMMARY

In some aspects of the present description, an optical system for displaying an image to a viewer is provided. The optical system includes a pixelated display adapted to emit a pixelated image; a first optical lens comprising a curved first major surface; a partial reflector disposed on and conforming to a major surface of the first optical lens; a first retarder layer disposed between the pixelated display and the partial reflector; a second retarder layer disposed between the first retarder layer and the partial reflector; and a reflective polarizer disposed between the first and second retarder layers. The pixelated display includes a plurality of light-emitting pixels where each light-emitting pixel is adapted to emit unpolarized image light. The partial reflector has an average optical reflectance of at least 30% in a predetermined wavelength range extending at least from about 450 nm to about 600 nm. The reflective polarizer substantially reflects light having a first polarization state and substantially transmitting light having an orthogonal second polarization state in the predetermined wavelength range. The reflective polarizer is adapted to: increase a brightness of a pixelated image emitted by the pixelated display and displayed to the viewer by recycling at least a portion of unpolarized image light emitted by each light-emitting pixel; and receive an image ray reflected by the partial reflector and reflect the received image ray toward the viewer.

In some aspects of the present description, an optical system for displaying a pixelated virtual image to a viewer is provided. The optical system includes a pixelated display system adapted to emit a pixelated image; and a folded optical system disposed between the pixelated display system and the viewer and adapted to receive the emitted pixelated image and form the pixelated virtual image. The pixelated display system and the folded optical system share a common reflective polarizer therebetween. The common reflective polarizer is adapted to: increase a brightness of the emitted pixelated image by recycling at least a portion of the emitted pixelated image within the pixelated display system; and reflecting at least a portion of the emitted pixelated image that is transmitted by the reflective polarizer, toward the viewer.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Folded optical systems such as those described in U.S. Pat. No. 9,557,568 (Ouderkirk et al.), for example, utilize a reflective polarizer and a partial reflector to provide a folded optical path. Such optical systems can be used in a head-mounted display, for example, to provide a high field of view, for example, to a viewer. A pixelated organic light emitting diode (OLED) display may be used to provide an image to the folded optical system. Such OLED displays typically include a circular polarizer having an absorptive linear polarizer and a quarter-wave retarder in order to reduce ambient reflection at the expense of reducing the brightness or efficiency of the display. As described in U.S. Pat. No. 9,773,847 (Epstein et al.), a reflective polarizer may be disposed between the absorbing polarizer and the retarder to increase the gain or brightness (e.g., by at least 10%, or at least 20%, or at least 30%) by recycling a portion of the light output of the emissive materials that would otherwise have been absorbed by the absorptive linear polarizer.

According to the present description, it has been found that a single reflective polarizer can be used to provide a folded optical path in a folded optical system and to provide recycling in a pixelated display system. A folded optical path between a partial reflector and a reflective polarizer, for example, refers to an optical path substantially longer (e.g., at least 2 times longer or about 3 times longer) than a distance between the reflective polarizer and the partial reflector. A folded optical system refers to an optical system including such a folded optical path. The pixelated display system may include an OLED display panel without the absorbing polarizer that is conventionally used in OLED display panels.

Figure 1:
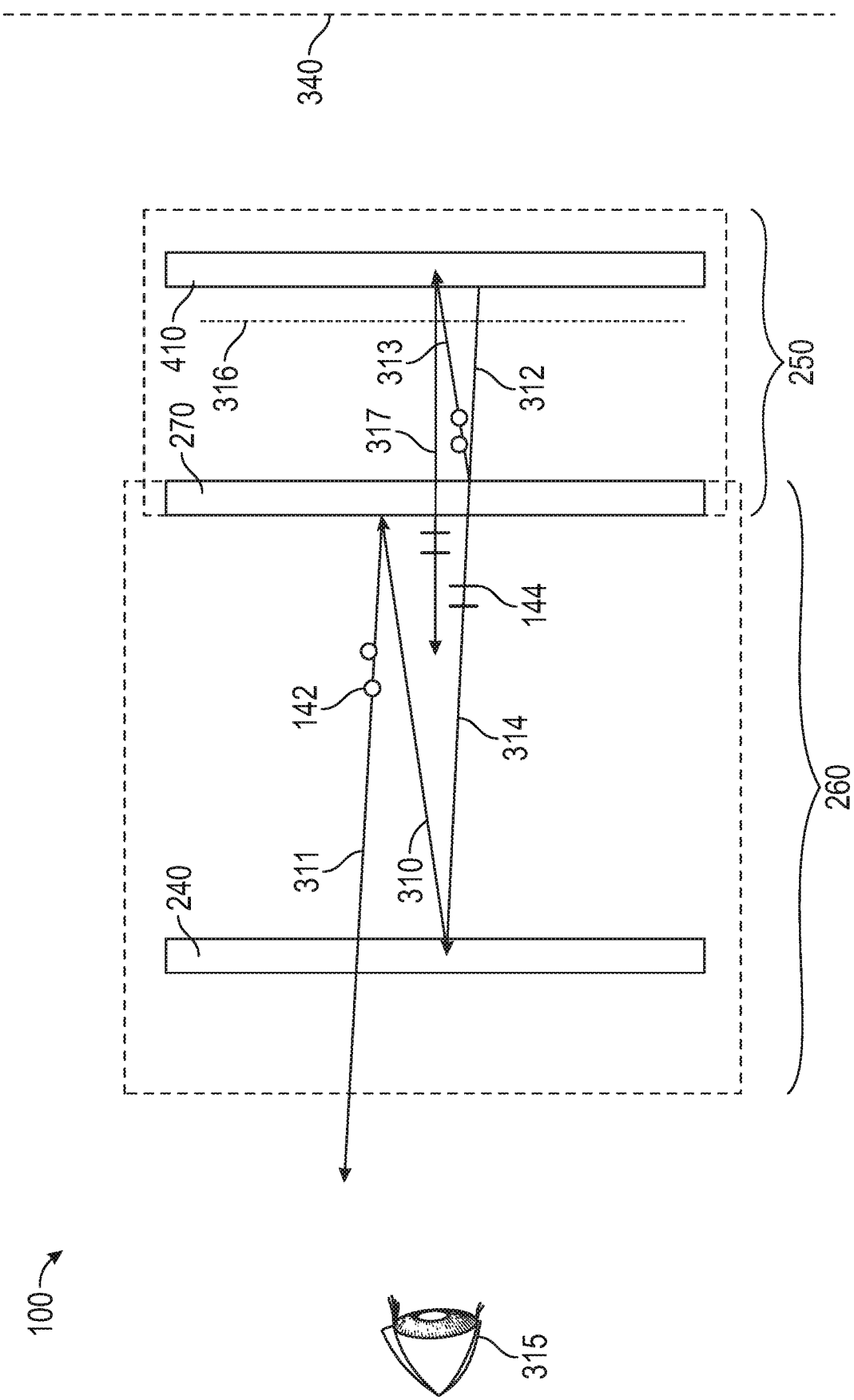
FIG. 1 is a schematic illustration of an optical system for displaying an image to a viewer.

FIG. 1 is a schematic cross-sectional view of an optical system 100 for displaying a pixelated virtual image 340 to a viewer 315. Optical system 100 includes a pixelated display system 250 which includes pixelated display 410 and which is adapted to emit a pixelated image 316. Optical system 100 further includes a folded optical system 260 disposed between the pixelated display system 250 and the viewer 315. The folded optical system 260 includes a partial reflector 240 which may be curved about two orthogonal axes (curvature not shown in the schematic illustration of FIG. 1). The pixelated display system 250 and the folded optical system 260 share a common reflective polarizer 270 therebetween. The folded optical system 260 is adapted to receive the emitted pixelated image 316 and form the pixelated virtual image 340. The common reflective polarizer 270 is adapted to increase a brightness of the emitted pixelated image 316 by recycling at least a portion of the emitted pixelated image 316 within the pixelated display system 250. For example, the emitted pixelated image 316 may be formed by light rays including light 312. A portion 314 of light 312 is transmitted through the reflective polarizer 270 and a portion 313 of light 312 is reflected by reflective polarizer 270 towards pixelated display 410. At least a portion 317 of the portion 313 is reflected by the pixelated display 410 back toward the reflective polarizer 270. At least a portion of the portion 317 is in the second polarization state when incident on the reflective polarizer 270 and is transmitted through the reflective polarizer 270. In this way, light 313 is at least partially recycled.

The folded optical system 260 folds an optical path of the emitted pixelated image 316 by virtue of each of the common reflective polarizer 270 and the partial reflector 240 reflecting the emitted pixelated image at least once within the folded optical system 260 before forming the pixelated virtual image 340. The common reflective polarizer 270 is adapted to reflect at least a portion of the emitted pixelated image 316 that is transmitted by the reflective polarizer 270, toward the viewer 315. For example, the portion of the emitted pixelated image 316 that is transmitted by the reflect polarizer 270 may include light 314, at least a portion 310 of which is reflected by partial reflector 240 back towards the reflective polarizer 270 which then reflects at least a portion 311 of the light 310 toward the viewer 315.

The light 311 and 313 has the first polarization state 142 immediately after reflecting from the reflective polarizer 270 and the light 314 and 317 has the second polarization state 144 immediately after being transmitted through the reflective polarizer 270 (retarder layers may be included to subsequently change the polarization state as described further elsewhere herein). The first polarization state 142 may be characterized as the block state of the reflective polarizer 270 and the second polarization state 144 may be characterized as the pass state of the reflective polarizer. In some embodiments, the reflective polarizer 270 is adapted to recycle at least a portion of the unpolarized image light 312 emitted by each light-emitting pixel in the pixelated display 410, by reflecting at least a portion 313 of the emitted light having the first polarization state 142, where at least a portion 317 of the reflected light has the second polarization state 144 and is transmitted by the reflective polarizer after being reflected by the pixelated display 410.

Figure 2:
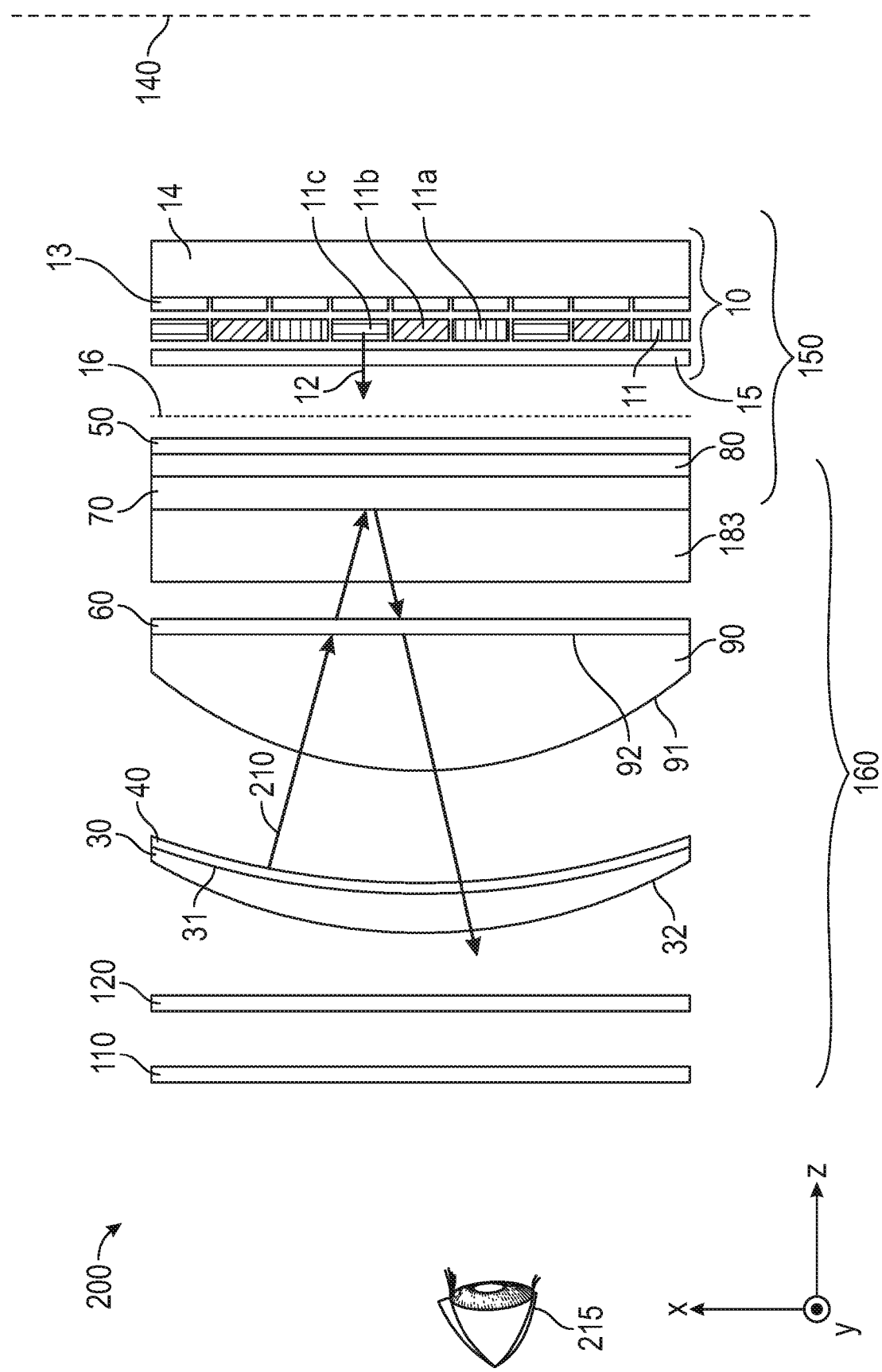
FIG. 2 is a schematic cross-sectional view of an optical system for displaying an image to a viewer.

The pixelated display system 250 and the folded optical system 260 may include additional elements not illustrated in FIG. 1 as described further elsewhere herein (see, e.g., FIG. 2).

FIG. 2 is a schematic cross-sectional view of an optical system 200 for displaying an image 140 (e.g., a pixelated virtual image) to a viewer 215. Optical system 200 may correspond to optical system 100, for example. Optical system 200 includes a pixelated display 10 adapted to emit a pixelated image 16. Pixelated display 10 includes a plurality of light-emitting pixels 11, where each light-emitting pixel is adapted to emit unpolarized image light 12. Optical system 200 further includes a first optical lens 30 having a curved first major surface 31; a partial reflector 40 disposed on and conforming to a major surface (e.g., first major surface 31 or opposing second major surface 32) of the first optical lens 30 and having an average optical reflectance of at least 30% in a predetermined wavelength range extending at least from about 450 nm to about 600 nm; a first retarder layer 50 disposed between the pixelated display 10 and the partial reflector 40; a second retarder layer 60 disposed between the first retarder layer 50 and the partial reflector 40; and a reflective polarizer 70 disposed between the first and second retarder layers 50 and 60.

The reflective polarizer 70 substantially reflects light having a first polarization state and substantially transmits light having an orthogonal second polarization state in the predetermined wavelength range. For example, the first polarization state for light rays in the illustrated cross-section may be the polarization state with an electric field along the y-direction referring to the x-y-z coordinate system depicted in FIG. 2 and the second polarization state may have an electric field in the x-z plane, or visa-versa. Substantially reflecting can be understood to mean reflecting at least 60% of incident light having the first polarization state in the predetermined wavelength range and substantially transmitting can be understood to mean a transmitting at least 60% of incident light having the second polarization state in the predetermined wavelength range. In some embodiments, the reflective polarizer 70 reflects at least 70% of light having the first polarization state and transmits at least 70% of light having the second polarization state in the predetermined wavelength range. In some embodiments, the reflective polarizer 70 reflects at least 80% of light having the first polarization state and transmits at least 80% of light having the second polarization state in the predetermined wavelength range.

The predetermined wavelength range extends from at least from about 450 nm to about 600 nm. It has been found average reflectances and average transmittances over wavelength ranges extending at least from about 450 nm to about 600 nm are useful in characterizing the reflective polarizer and/or the partial reflector. The predetermined wavelength range may extend to wavelengths lower than 450 nm and/or to wavelengths higher than 600 nm. In some embodiments, the predetermined wavelength range extends at least from about 400 nm to about 600 nm, or extends at least from about 450 nm to about 650 nm, or extends at least from about 450 nm to about 700 nm, or extends at least from about 400 nm to about 700 nm. In some embodiments, the predetermined wavelength range is from about 450 nm to about 600 nm, or from about 450 nm to about 650 nm, or from about 450 nm to about 700 un, or from about 400 nm to about 600 nm, or from about 400 nm to about 700 nm.

The reflective polarizer 70 is adapted to increase a brightness of a pixelated image 16 emitted by the pixelated display 10 and displayed to the viewer 215 by recycling at least a portion of unpolarized image light 12 emitted by each light-emitting pixel 11; and the reflective polarizer 70 is adapted to receive an image ray 210 reflected by the partial reflector 40 and reflect the received image ray 210 toward the viewer 215. In some embodiments, the reflective polarizer 70 is adapted to increase the brightness of a pixelated image emitted by the pixelated display by at least 10%, or at least 20%, or at least 30%. In some embodiments, the reflective polarizer 70 is adapted to recycle at least a portion of the unpolarized image light 12 emitted by each light-emitting pixel 11, by reflecting at least a portion of the emitted light having the first polarization state, where at least a portion of the reflected light has the second polarization state and is transmitted by the reflective polarizer after being reflected by the pixelated display 10.

Any suitable display can be utilized as the pixelated display 10. In some embodiments, the pixelated display 10 is a pixelated organic light emitting diode (OLED) display. In some embodiments, each light-emitting pixel includes a corresponding thin film transistor 13. In some embodiments, the plurality of light-emitting pixels 11 is disposed on a substrate 14. In some embodiments, an average optical reflectance of the substrate 14 in a visible range (e.g., wavelengths from 400 nm to 700 nm) is greater than about 20%, or greater than about 30%, or greater than about 40%, or greater than about 50%, or greater than about 60%, or greater than about 60%, or greater than about 70%. The average is an unweighted average over wavelengths in the visible range and over the area of the substrate 14. The substrate 14 may include a reflective metallic layer, for example, or may include a reflective stack of alternating dielectric layers, for example. In some embodiments, the plurality of light-emitting pixels 11 includes at least a first light-emitting pixel 11a adapted to emit unpolarized blue image light (e.g., wavelengths between 400 nm and 500 nm), at least a second light-emitting pixel 11b adapted to emit unpolarized green image light (e.g., wavelengths between 500 nm and 600 nm), and at least a third light-emitting pixel 11c adapted to emit unpolarized red image light (e.g., wavelengths between 600 nm and 700 nm). In some embodiments, the pixelated display 10 further includes an optically transparent electrode 15 disposed on the plurality of light-emitting pixels 11.

In some embodiments, the curved first major surface 31 of the first optical lens 30 is concave toward the pixelated display 10. In some embodiments, the first optical lens 30 has a curved second major surface 32 concave toward the pixelated display 10. In some embodiments, the partial reflector 40 is disposed on and conforms to the curved first major surface 31 of the first optical lens 30.

In some embodiments, the first retarder layer 50 is substantially a quarter-wave retarder for at least one wavelength in the predetermined wavelength range (e.g., having a retardance within 10% or within 5% of % of the wavelength for at least one wavelength in the predetermined wavelength range). In some embodiments, the optical system of 200 further includes a first adhesive layer 80 bonding the first retarder layer 50 to the reflective polarizer 70. In some embodiments, the second retarder layer 60 is substantially a quarter-wave retarder for at least one wavelength in the predetermined wavelength range. In some embodiments, the optical system 200 further includes a second optical lens 90 disposed between the first optical lens 30 and the reflective polarizer 70. In some embodiments, the second optical lens 90 has a curved first major surface 91 concave toward the pixelated display 10, and an opposing planar second major surface 92 disposed between the first major surface 91 of the second optical lens 90 and the pixelated display 10. In some embodiments, the second retarder layer 60 is disposed on the planar second major surface 92 of the second optical lens 90.

In some embodiments, the reflective polarizer 70 is disposed on a transparent barrier substrate 183, where the reflective polarizer 70 is disposed between the barrier substrate 183 and the pixelated display 10, and where the barrier substrate 183 is bonded to the pixelated display 10 for preventing permeation of at least one of moisture or oxygen into the pixelated display 10. The transparent barrier substrate 183 may be or include glass, for example.

In some embodiments, the optical system 200 further includes an absorbing polarizer 110 disposed between the viewer 215 and the partial reflector 40. In some embodiments, the absorbing polarizer 110 substantially transmits light having the first polarization state (e.g., transmits at least 60%, or at least 70%, or at least 80% of light having the first polarization state) and substantially absorbs light having the second polarization state (e.g., absorbs greater than 50%, or greater than 60%, or greater than 70% of light having the second polarization state) in the predetermined wavelength range. In some embodiments, the optical system 200 further includes a third retarder layer 120 disposed between the absorbing polarizer 110 and the partial reflector 40. In some embodiments, the third retarder layer 120 is substantially a quarter-wave retarder for at least one wavelength in the predetermined wavelength range. In some embodiments, the second and third retarder layers 60 and 120 have fast axes substantially orthogonal (e.g., within 20 degrees or within 10 degrees of orthogonal) to one another. Utilizing retarders having substantially orthogonal fast axes allows at least a partial cancelation of a variation in polarization state due to the wavelength dependence of the retardance of the retarders, for example. The absorbing polarizer 110 and third retarder layer 120 may be included to block light from reaching the viewer 215 that was transmitted through the reflective polarizer 70 and the partial reflector 40 without having been previously reflected by the partial reflector 40. For example, light transmitted through the reflective polarizer 70 in the second polarization state (pass polarization state of reflective polarizer 70) that is transmitted through the partial reflector 40 without having been reflected by the partial reflector 40 may be in a block polarization state of the absorbing polarizer 110 when incident on the absorbing polarizer 110 in embodiments where the second and third retarder layers 60 and 120 have fast axes substantially orthogonal to one another and the second polarization state is the block state of the absorbing polarizer 110. In other embodiments, the absorbing polarizer 110 substantially transmits light having the second polarization state and substantially absorbs light having the first polarization state in the predetermined wavelength range and the second and third retarder layers 60 and 120 have fast axes substantially parallel (e.g., within 20 degrees or within 10 degrees of parallel) to one another.

In some embodiments, an optical system 200 for displaying a pixelated virtual image 140 to a viewer 215 is provided. The optical system 200 includes a pixelated display system 150 adapted to emit a pixelated image 16; and a folded optical system 160 disposed between the pixelated display system 150 and the viewer 215 and adapted to receive the emitted pixelated image 16 and form the virtual image 140. The pixelated display system 150 and the folded optical system 160 share a common reflective polarizer 70 therebetween. The common reflective polarizer 70 is adapted to increase a brightness (e.g., the axial intensity) of the emitted pixelated image 16 by recycling at least a portion of the emitted pixelated image 16 within the pixelated display system 150; and is adapted to reflect at least a portion of the emitted pixelated image 16 that is transmitted by the reflective polarizer 70, toward the viewer 215. In some embodiments, the folded optical system 160 folds an optical path of the emitted pixelated image 16 by each of the common reflective polarizer 70 and the partial reflector 40 reflecting the emitted pixelated image at least once within the folded optical system 160 before forming the pixelated virtual image 140.

The partial reflector used in any of the optical systems of the present description may be any suitable partial reflector. In some embodiments, the partial reflector 40 has an average optical transmittance of at least 30% in the predetermined wavelength range. In some embodiments, the partial reflector 40 includes a metal. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, for a normally incident light in a predetermined wavelength range extending at least from about 450 nm to about 600 nm, the partial reflector has an average optical reflectance of at least 30%. In some embodiments, the average optical reflectance of the partial reflector is in a range of 40% to 60%. In some embodiments, the partial reflector has an average optical reflectance and an average optical transmittance in the predetermined wavelength range that are each in a range 30% to 70%, or each in a range of 40% to 60%, or each in a range of 45% to 55%. The partial reflector may be a half mirror, for example.

The average optical reflectance of the partial reflector refers to the optical reflectance for unpolarized light normally incident on the partial reflector and averaged (unweighted mean) over wavelengths in the predetermined wavelength range, unless specified differently. The average optical reflectance and average optical transmittance for the reflective polarizer for a specified polarization state may similarly refer to the optical reflectance and optical transmittance, respectively, for light normally incident on the reflective polarizer in the specified polarization state and averaged (unweighted mean) over wavelengths in the predetermined wavelength range. For example, in some embodiments, for normally incident light in the predetermined wavelength range, the reflective polarizer has an average optical reflectance for the first polarization state of at least 60%, or at least 70%, or at least 80%; and has an average optical transmittance for the second polarization state of at least 60%, or at least 70%, or at least 80%.

Figure 3:
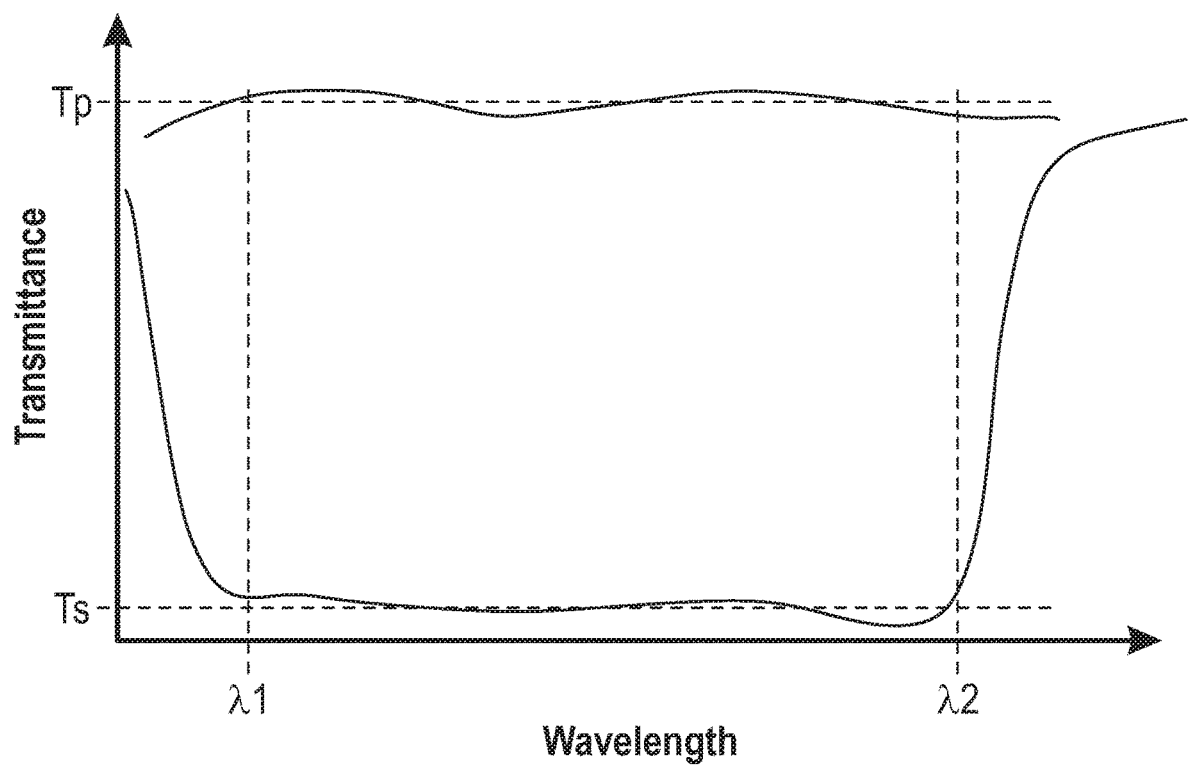
FIG. 3 is a schematic plot of the transmittance of a reflective polarizer for orthogonal first and second polarization states.

FIG. 3 is a schematic plot of the transmittance of a reflective polarizer for orthogonal first and second polarization states for normally incident light. The average of the transmittance over wavelengths in the predetermined wavelength range from $\lambda 1$ to $\lambda 2$ is Ts in the first polarization state and Tp in the second polarization state. In some embodiments, $\lambda 1$ is in a range from about 400 nm to about 450 nm, and $\lambda 2$ is in a range from about 600 nm to about 700 nm or from about 650 nm to about 700 nm. In some embodiments, Tp is at least 60%, or at least 70%, or at least 80%. In some embodiments, Ts is no more than 30%, or no more than 20%, or no more than 10% or no more than 5%, or no more than 3%.

Figure 4:
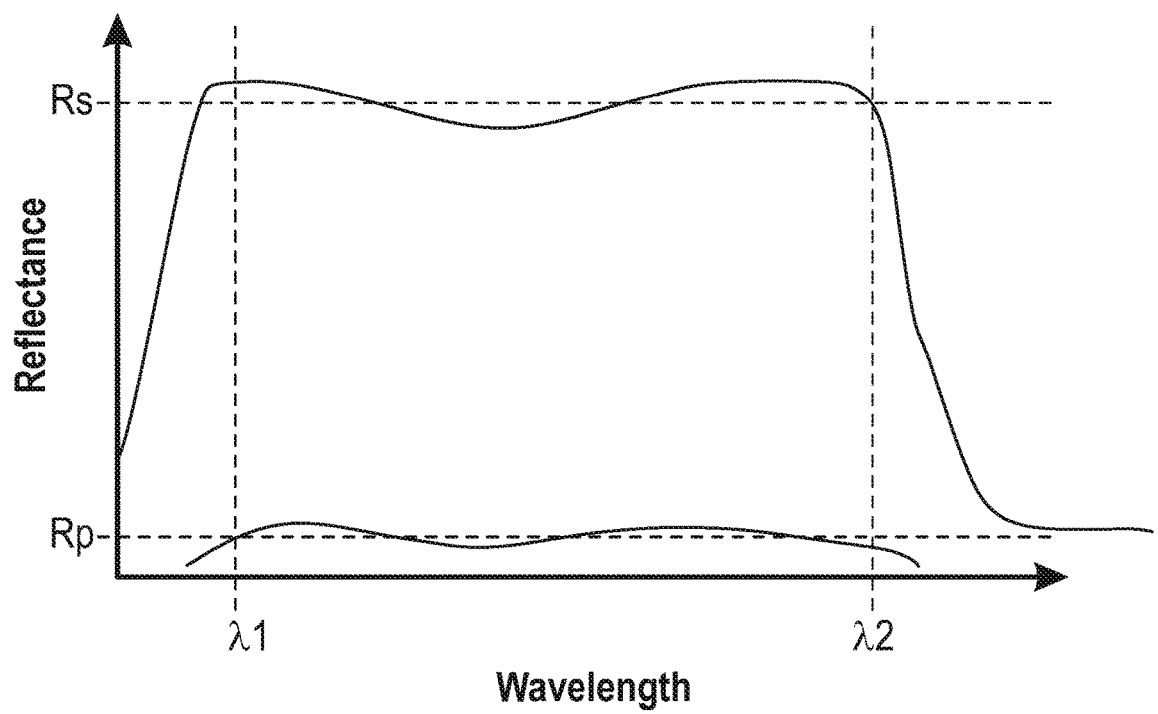
FIG. 4 is a schematic plot of the reflectance of a reflective polarizer for orthogonal first and second polarization states.

FIG. 4 is a schematic plot of the reflectance of a reflective polarizer for orthogonal first and second polarization states for normally incident light. The average of the reflectance over wavelengths in the predetermined wavelength range from $\lambda 1$ to $\lambda 2$ is Rs in the first polarization state and Rp in the second polarization state. In some embodiments, Rs is at least 60%, or at least 70%, or at least 80%. In some embodiments, Rp is no more than 30%, or no more than 20%, or no more than 10%, or no more than 5%.

The transmittance and/or reflectance shown in FIGS. 3-4 may be for a location on a reflective polarizer and each location on the reflective polarizer may have a corresponding transmittance and reflectance which may vary somewhat from location to location due to a forming process, for example. For example, each location may have a corresponding reflection band generally as illustrated in FIG. 4, but the band edge wavelengths $\lambda 0$ and/or $\lambda 3$ may vary somewhat with position. A reflective polarizer may be said to have an average transmittance and/or reflectance in a specified range if at least one location on the reflective polarizer has an average transmittance and/or reflectance in the specified range. In some embodiments, each location in at least a majority of the area of the optical film, or each location in all or substantially all of the area of the optical film may have the specified average transmittance and/or reflectance.

The materials used in the manufacture of multilayer optical film reflective polarizers are typically polymer materials that have very low absorption at least over visible and near-visible wavelengths and for typical optical path distances within the film. Thus, the % reflection R and the % transmission T of a multilayer film for a given light ray are typically substantially complementary, i.e., $R+T \approx 100\%$, usually within an accuracy of about 1%.

The transmittance of an optical film, such as a reflective polarizer film, refers generally to the transmitted light intensity divided by the incident light intensity (for light of a given wavelength, incident direction, etc.), but may be expressed in terms of "external transmittance" or "internal transmittance". The external transmittance of an optical film is the transmittance of the optical film when immersed in air, and without making any corrections for Fresnel reflections at the air/element interface at the front of the element or for Fresnel reflections at the element/air interface at the back of the element. The internal transmittance of an optical film is the transmittance of the film when the Fresnel reflections at its front and back surfaces have been removed. The removal of the front and back Fresnel reflections may be done either computationally (e.g., by subtracting an appropriate function from the external transmission/reflection spectrum which can be determined from the Fresnel equations and measured refractive indices of the outermost layers of the optical film), or experimentally (e.g., the internal transmittance and internal reflectance can be extracted from measurements of reflectance and transmittance of the optical film with and without an absorptive polarizer disposed on the front sides of the optical film and suitably aligned with the optical film, measurements of reflectance and transmittance of the optical film with and without absorptive polarizers disposed on the front and the back sides of the optical film and suitably aligned with the optical film, and measurements of the reflectance and transmittance of the absorbing polarizer). For many types of polymer and glass materials, the Fresnel reflections are about 4 to 6% (for normal or near-normal angles of incidence) at each of the two outer surfaces, which results in a downward shift of about 10% for the external transmittance relative to the internal transmittance.

Thus, the internal transmission of an optical film refers to the transmission that results only from interior portions of the film component, and not the two outer surfaces thereof. Analogous to internal transmission is "internal reflection". The internal reflection of a film refers to the reflection that results only from interior portions of the film component, and not the two outermost surfaces thereof. The transmittance or reflectance of an optical film may also be determined for the film immersed in some medium such as a glass. For example, if a glass has a refractive index close to that of the outer layers of the optical film and an index matched adhesive is used to bond the optical film to glass (e.g., a glass prism) on each side of the optical film, the normally incident transmittance and reflectance of the optical film immersed in the glass will be approximately equal to the normally incident internal transmittance and reflectance, respectively. If transmittance or reflectance is referred to herein without being specified as internal or external, it should be assumed that the transmittance or reflectance refers to internal transmittance or internal reflectance, respectively, unless otherwise indicated by the context.

The internal reflection and transmission characteristics can be readily determined from optical modeling or from laboratory measurements. In the case of calculated values of reflectivity and transmission for a modeled film, the internal reflection and transmission is readily accomplished by omitting the calculation of those surface reflectivities from the computed value. The reflection spectrum and all of its features such as the reflectivity at any angle and the band edges for birefringent multilayer films can be calculated using the 4×4 stack code of Berreman and Scheffer, Phys. Rev. Lett. 25, 577 (1970). A description of this method is given in the book "Ellipsometry and Polarized Light" written by Azzam and Bashara, published by Elsevier Science, Holland.

In the case of measured values of reflectivity or transmission, the internal reflection and transmission characteristics can be determined by taking measurements of the film in air and subtracting a calculated or measured value representative of only the surface reflectivities. For example, given a multilayer film having a smooth and clear surface layer which is much thicker than the interference layers, the index of refraction of this surface layer can be measured. Once the index of the surface layer is known, the surface reflectivity can be subtracted from the total measured reflectivity by using mathematical formulas which are well known in the art.

The reflective polarizer used in the optical systems of the present description may be any suitable type of reflective polarizer. In some embodiments, the reflective polarizer (e.g., reflective polarizer 70 or 270) is or includes a multi-layer polymeric optical film. In some embodiments, the reflective polarizer (e.g., reflective polarizer 70 or 270) is or includes a wire-grid reflective polarizer.

Figures 5, 6:
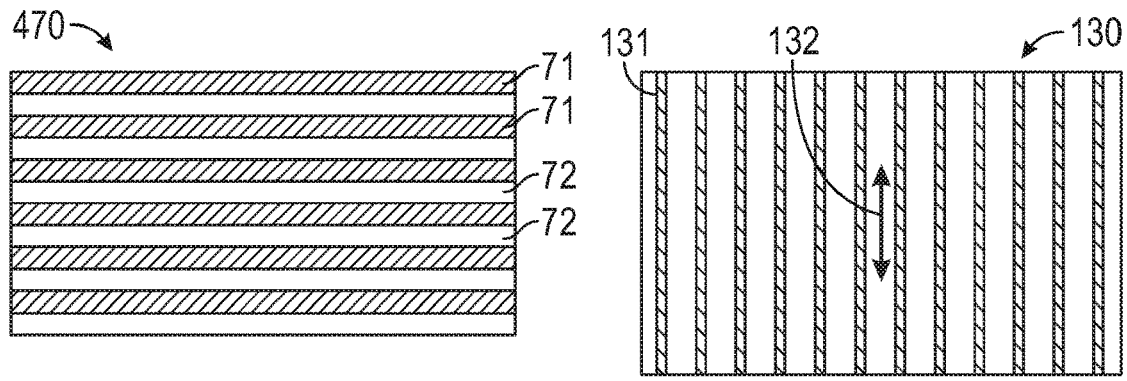
FIG. 5 is a schematic cross-sectional view of a multilayer reflective polarizer.
FIG. 6 is a schematic front view of a wire-grid polarizer.

FIG. 5 is a schematic cross-sectional view of a multilayer reflective polarizer 470, which may correspond to reflective polarizer 70 or 270, for example. In some embodiments, the reflective polarizer 470 includes a plurality of polymeric layers. In some embodiments, the reflective polarizer 470 includes a plurality of alternating first 71 and second 72 polymeric layers. In some embodiments, the plurality of alternating first 71 and second 72 polymeric layers number between 100 and 700, and each first and second polymeric layer 71 and 72 have an average thickness less than about 500 nm. In some embodiments, the reflective polarizer 470 (or the common reflective polarizer 70 or 270) includes a plurality of alternating first polymeric layers 71 having a lower index of refraction and second polymeric layers 72 having a higher index of refraction. For example, the index of refraction of the first polymeric layers 71 along the block axis may be less than the index of refraction of the second polymeric layers 72 along the block axis at a predetermined wavelength (e.g., 532 nm, or 550 nm, or 633 nm) in the predetermined wavelength range.

The first and second layers 71 and 72 may be interference layers reflecting and transmitting light primarily by optical interference. Outer skin or protective boundary layers which are noninterference layers may also be included in a reflective polarizer film. Interference layers may be described as reflecting and transmitting light primarily by optical interference when the reflectance and transmittance of the interference layers can be reasonably described by optical interference or reasonably accurately modeled as resulting from optical interference. Adjacent pairs of interference layers having different refractive indices reflect light by optical interference when the pair has a combined optical thickness (refractive index along the block axis times physical thickness) of ½ the wavelength of the light. In some embodiments, the optical thicknesses of adjacent pairs of interference layers in an optical repeat unit are about equal. Interference layers typically have a physical thickness of less than about 500 nm or less than about 200 nanometers. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference. Noninterference layers typically have a physical thickness of at least 1 micrometer, or at least 5 micrometers. The interference layers 3102 may be a plurality of polymeric interference layers reflecting and transmitting light primarily by optical interference in the predetermined wavelength range. The average thickness of the reflective polarizer film including the interference layers and the noninterference layers may be less than about 500 micrometers.

Suitable materials for the alternating polymeric layers include, for example, polyethylene naphthalate (PEN), copolymers containing PEN and polyesters (e.g., polyethylene terephthalate (PET) or dibenzoic acid), glycol modified polyethylene terephthalate, polycarbonate (PC), or blends of these classes of materials.

Methods of making optical films including alternating polymeric interference layers are known in the art and are described in U.S. Pat. No. 5,882,774 (Jonza et al.), U.S. Pat. No. 6,179,948 (Merrill et al.), U.S. Pat. No. 6,783,349 (Neavin et al.), and U.S. Pat. No. 9,162,406 (Neavin et al.), for example. In brief summary, the fabrication method can include: (a) providing at least a first and a second stream of resin corresponding to the first and second polymers to be used in the finished film; (b) dividing the first and the second streams into a plurality of layers using a suitable feedblock; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. After the multilayer web is cooled on the chill roll, it can be drawn or stretched to produce a finished or near-finished multilayer optical film. The drawing or stretching accomplishes two goals: it thins the layers to their desired final thicknesses, and it orients the layers such that at least some of the layers become birefringent. The orientation or stretching can be accomplished along the cross-web direction (e.g., via a tenter), along the down-web direction (e.g., via a length orienter), or any combination thereof, whether simultaneously or sequentially.

In some embodiments, the reflective polarizer comprises a plurality of alternating first and second polymeric layers, where each second polymeric layer is substantially uniaxially oriented at one or more locations (e.g., at all location when the reflective polarizer is substantially planar and at locations from an apex of a curved reflective polarizer along an arc generally along the block axis of the reflective polarizer). A substantially uniaxially oriented layer has indices of refraction in one in-plane (e.g., length) direction and a thickness direction that are substantially the same (e.g., within 0.02 or within 0.01), but substantially different (e.g., a least 0.05 different) from an index of refraction in an orthogonal in-plane (e.g., width) direction. In some embodiments, the multilayer optical film, prior to any forming process, is a substantially uniaxially drawn film and has a degree of uniaxial character U of at least 0.7, or at least 0.8, or at least 0.85, where $U=(1/\text{MDDR}-1)/(\text{TDDR}^{1/2}-1)$ with MDDR defined as the machine direction draw ratio and TDDR defined as the transverse direction draw ratio. Such substantially uniaxially oriented multilayer optical films are described in U.S. Pat. Appl. No. 2010/0254002 (Merrill et al.) and can be obtained by using a parabolic tenter to orient the multilayer film. As described in U.S. Pat. No. 9,557,568

(Ouderkirk et al.) substantially uniaxially oriented reflective polarizer films offer improved performance in folded optical systems.

In some embodiments, the reflective polarizer of an optical system of the present description is or includes a wire-grid polarizer. Suitable wired-grid polarizers are known in the art and typically include substantially parallel (e.g., within 20 degrees, or within 10 degrees, or within 5 degrees, or within 2 degrees of parallel) metallic wires disposed on a substrate (e.g., substrate 183) and spaced apart by a distance substantially less than wavelengths in a predetermined wavelength range. Such wire-grid polarizers can be made using lithographic techniques, for example. FIG. 6 is a schematic front view of a wire-grid polarizer 130, which may correspond to reflective polarizer 70 or 270, for example. The wire-grid polarizer 130 includes a plurality of substantially parallel metallic lines 131 extending along a direction 132 of the first polarization state.

The retarder layer(s) used in the optical systems of the present description can be films or coatings or a combination of films and coatings. Suitable films include birefringent polymer film retarders such as those available from Meadowlark Optics (Frederick, CO), for example. Suitable coatings for forming a retarder layer include the linear photo-polymerizable polymer (LPP) materials and the liquid crystal polymer (LCP) materials described in U.S. Pat. No. 6,717,644 (Schadt et al.), U.S. Pat. No. 6,905,739 (Cherkaoui et al.), U.S. Pat. No. 7,201,948 (Moia et al.), U.S. Pat. No. 7,364,671 (Schadt et al.), and U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland). In some embodiments, the retarder layer is less than about 2 micrometers thick. Utilizing a thin first retarder layer 50 and first adhesive layer 80 may be desired in order to position the reflective polarizer 70 close to a plane of the plurality of pixels 11 in order to avoid or minimize cross-talk between adjacent pixels.

Figure 7A:
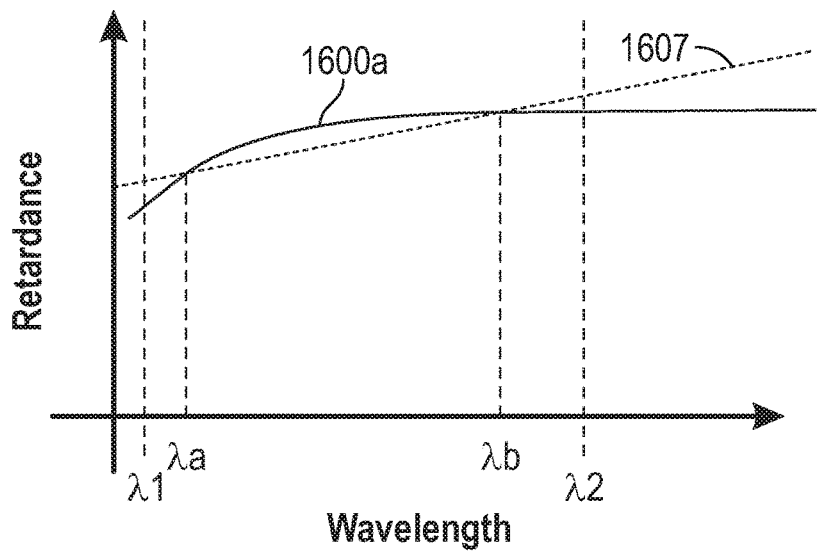
FIGS. 7A-7B are schematic plots of retardance versus wavelength.
Figure 7B:
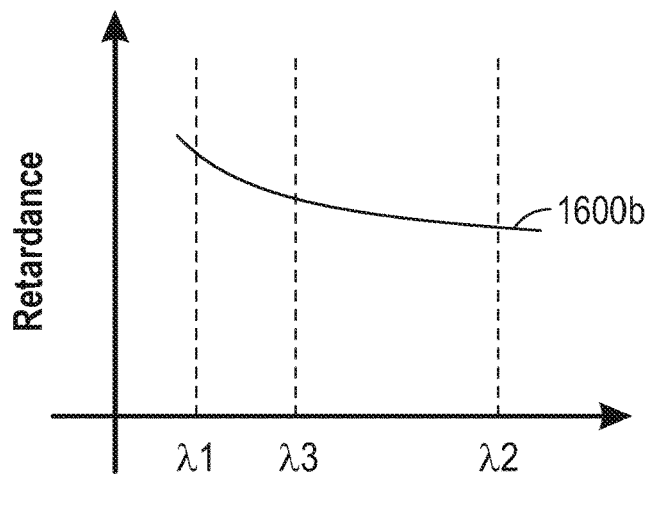

FIG. 7A is a schematic illustration of retardance (e.g., in nm) versus wavelength for a retarder. The retardance versus wavelength is a wavelength dispersion curve 1600a. The dispersion curve 1600a is similar to the dispersion curve of an achromatic retarder available from Merck (Darmstadt, Germany), for example. The dispersion curve 1607 of an ideal achromatic quarter-wave retarder is also shown. The retarder having the dispersion curve 1600a may be a quarter-wave retarder at the wavelength λa and at λb, for example, and may be substantially quarter-wave (e.g., a retardance within 10% or within 5% of quarter wave) over a wavelength range in the predetermined wavelength range (e.g., from λ1 to λ2). FIG. 7B is a schematic illustration of a wavelength dispersion curve 1600b for a different retarder layer. The dispersion curve 1600b is similar to a dispersion curve of a conventional retarder such as that of an oriented polymer layer. The dispersion curve 1600b changes monotonically with increasing wavelength in the predetermined wavelength range. The retarder layer having the dispersion curve 1600b may be a substantially quarter-wave retarder at the wavelength λ3, for example.

The optical lens(es) used in the optical systems of the present description may be any suitable type of optical lenses. The optical lenses may be made from glass or polymers (e.g., low birefringence polymethylmethacrylate), for example.

Figure 8:
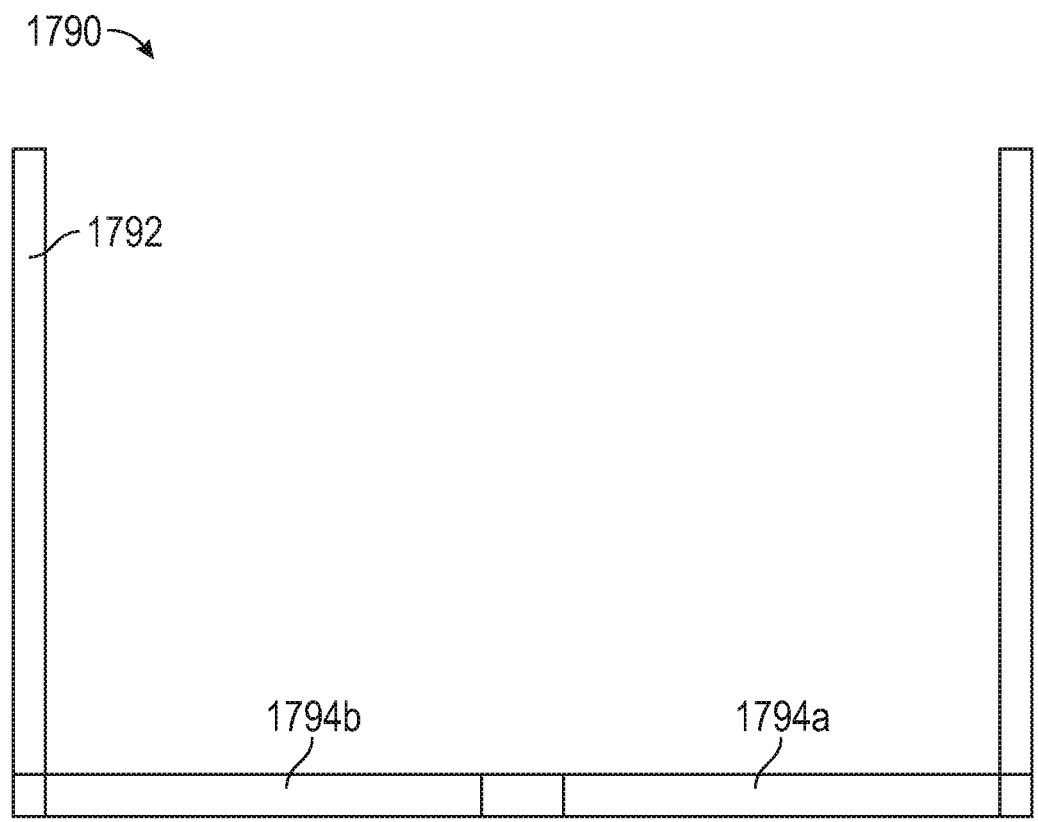
FIG. 8 is a schematic top view of a head-mounted display.

In some embodiments, a head-mounted display including at least one optical system of the present description is provided. For example, a head-mounted display may include proximate left and right optical systems where each of the left and right optical systems is an optical system of the present description, the left optical system is configured to provide images to a left eye of the viewer, and the right optical system adapted to provide images to a right eye of the viewer. In some embodiments, the left and right displays are or include left and right portions of a contiguous pixelated display panel. Similarly, in some embodiments, the left and right reflective polarizer are or include left and right portions of a contiguous reflective polarizer. In other embodiments, separate left and right pixelated display panels and separate left and right reflective polarizers are used in the left and right optical systems. FIG. 8 is a schematic top view of head-mounted display 1790 including a frame 1792, and left and right display portions 1794a and 1794b which may include respective left and right optical systems where each of the left and right optical systems is an optical system according to the present description disposed such that the partial reflector (e.g., 40 or 24) faces the viewer and the pixelated display (e.g., 10 or 410) faces away from the viewer when the head-mounted display 1790 is worn.

If the use of "about" or "substantially" as applied to quantities expressing feature sizes, amounts, and physical properties is not otherwise clear to one of ordinary skill in the art in the context in which it is used and described in the present description, "about" or "substantially" will be understood to mean within 10 percent of the specified quantity, but also includes exactly the specified quantity. For example, if it is not otherwise clear to one of ordinary skill in the art in the context in which it is used and described in the present description, a quantity having a value of about 1, or a value of substantially 1, means that the quantity has a value between 0.9 and 1.1, but also includes a value of exactly 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system for displaying an image to a viewer, comprising:
   a pixelated display adapted to emit a pixelated image and comprising a plurality of light-emitting pixels, each light-emitting pixel adapted to emit unpolarized image light;
   a first optical lens comprising a curved first major surface;
   a partial reflector disposed on and conforming to a major surface of the first optical lens and having an average optical reflectance of at least 30% in a predetermined wavelength range extending at least from about 450 nm to about 600 nm;
   a first retarder layer disposed between the pixelated display and the partial reflector;

a second retarder layer disposed between the first retarder layer and the partial reflector; and a reflective polarizer disposed between the first and second retarder layers and substantially reflecting light having a first polarization state and substantially transmitting light having an orthogonal second polarization state in the predetermined wavelength range, wherein the reflective polarizer is adapted to:

increase a brightness of a pixelated image emitted by the pixelated display and displayed to the viewer by recycling at least a portion of unpolarized image light emitted by each light-emitting pixel, by reflecting at least a portion of the emitted light having the first polarization state, wherein at least a portion of the reflected light has the second polarization state and is transmitted by the reflective polarizer after being reflected by the pixelated display; and receive an image ray reflected by the partial reflector and reflect the received image ray toward the viewer.

2. The optical system of claim 1, wherein the plurality of light-emitting pixels is disposed on a substrate having an average optical reflectance in a visible range greater than about 20%.

3. The optical system of claim 1, wherein the first retarder layer is substantially a quarter-wave retarder for at least one wavelength in the predetermined wavelength range.

4. The optical system of claim 1, wherein the second retarder layer is substantially a quarter-wave retarder for at least one wavelength in the predetermined wavelength range.

5. The optical system of claim 1 further comprising a second optical lens disposed between the first optical lens and the reflective polarizer.

6. The optical system of claim 5, wherein the second optical lens comprises a curved first major surface concave toward the pixelated display, and an opposing planar second major surface disposed between the first major surface of the second optical lens and the pixelated display.

7. The optical system of claim 6, wherein the second retarder layer is disposed on the planar second major surface of the second optical lens.

8. The optical system of claim 1, wherein the reflective polarizer is disposed on a transparent barrier substrate, the reflective polarizer disposed between the barrier substrate and the pixelated display, the barrier substrate bonded to the pixelated display for preventing permeation of at least one of moisture or oxygen into the pixelated display.

9. The optical system of claim 1 further comprising an absorbing polarizer disposed between the viewer and the partial reflector, the absorbing polarizer substantially transmitting light having the first polarization state and substantially absorbing light having the second polarization state in the predetermined wavelength range.

10. The optical system of claim 9 further comprising a third retarder layer disposed between the absorbing polarizer and the partial reflector.

11. An optical system for displaying an image to a viewer, comprising:

a pixelated display adapted to emit a pixelated image and comprising a plurality of light-emitting pixels, each light-emitting pixel adapted to emit unpolarized image light;

a first optical lens comprising a curved first major surface;

a partial reflector disposed on and conforming to a major surface of the first optical lens and having an average optical reflectance of at least 30% in a predetermined wavelength range extending at least from about 450 nm to about 600 nm;

a first retarder layer disposed between the pixelated display and the partial reflector;

a second retarder layer disposed between the first retarder layer and the partial reflector; and a reflective polarizer disposed between the first and second retarder layers and substantially reflecting light having a first polarization state and substantially transmitting light having an orthogonal second polarization state in the predetermined wavelength range, wherein the reflective polarizer is adapted to:

increase a brightness of a pixelated image emitted by the pixelated display and displayed to the viewer by recycling at least a portion of unpolarized image light emitted by each light-emitting pixel; and receive an image ray reflected by the partial reflector and reflect the received image ray toward the viewer, wherein the reflective polarizer is disposed on a transparent barrier substrate, the reflective polarizer disposed between the barrier substrate and the pixelated display, the barrier substrate bonded to the pixelated display for preventing permeation of at least one of moisture or oxygen into the pixelated display.

* * * * *